Patented Oct. 17, 1922.

1,432,632

UNITED STATES PATENT OFFICE.

CLARENCE S. STEVENS, OF SHEBOYGAN, AND CARL A. BAUMANN, OF JEFFERSON, WISCONSIN, ASSIGNORS, BY MESNE ASSIGNMENTS, TO CARNATION MILK PRODUCTS COMPANY, OF CHICAGO, ILLINOIS, A CORPORATION OF DELAWARE.

MILK FOOD PRODUCT AND METHOD OF MAKING SAME.

No Drawing. Application filed October 20, 1916. Serial No. 126,681.

*To all whom it may concern:*

Be it known that we, CLARENCE S. STEVENS and CARL A. BAUMANN, citizens of the United States, and residents, respectively, of Sheboygan, in the county of Sheboygan, and of Jefferson, in the county of Jefferson, and State of Wisconsin, have invented certain new and useful Improvements in Milk Food Products and Methods of Making the Same, of which the following is a true and complete specification.

This invention has for its object to provide a food product corresponding to commercial unsweetened condensed or evaporated milk as it is now known in the art, but which will be less expensive and will possess superior keeping qualities to such condensed or evaporated milk as heretofore manufactured, this new product, however being characterized by the fact that a foreign fat is substituted for the original animal fat of the milk, while, notwithstanding such substitution, the product has substantially the same taste and appearance as ordinary evaporated milk and is capable of the same uses as such commercially well known products.

As disclosed in a prior application for patent filed by us on January 23rd, 1915, Serial No. 3,091, and of which the present application is, in part, a continuation, our invention contemplates a food product as above characterized wherein more or less of the butter fat of the original milk is extracted or removed and a suitable vegetable fat substituted therefor. We so combine or incorporate the vegetable fat in the skim milk as to produce a permanent stable emulsion of the fat with the milk constituents. Our invention therefore, consists in a new and useful process whereby the permanent stable emulsion of the milk and fat is secured and of which we will hereinafter describe and claim a practical embodiment. Likewise our new and useful product will also be fully described and finally claimed.

One procedure in carrying out our present invention may be described as follows:

Fresh whole cows' milk contains, among other elements, fat, and in the present process, we utilize such milk with the fat either partially or substantially wholly extracted from the milk. We extract substantially 90% of the original butter fat. Very often 97 to 98% is desirable. This butter fat constitutes a valuable by-product of the process, since it may be readily converted into butter.

In place of the extracted butter fat we substitute a foreign fat which is less expensive than the original butter fat. Preferably we use a vegetable fat and we have found that refined cocoanut oil is suitable for our purpose. Ordinary cocoanut oil of commerce which, as is well known, is refined and thereby rendered edible, is quite solid at ordinary temperatures and pressures, and has a melting point of about 85° F. We use a temperature sufficiently high to reduce the cocoanut oil to a desired fluid state or condition and add the same to milk from which butter fat has been partially or entirely removed by any approved means, such for instance as the well known separator. The skim milk is placed in a suitable container and though not essential, may have a temperature of about 71° C. when the cocoanut fat is added.

The mixture of skim milk and cocoanut fat are now subjected to the action of live steam in the form of a jet or jets, the action of which is more or less uniformly distributed against the contents of the container which are thereby simultaneously subjected to the heat and the pressure of the steam. The jet or jets of steam, in addition to mechanically agitating the skim milk and cocoanut fat, also, owing to the increase in temperature, act to increase the surface tension of the fat with relation to that of the surrounding liquid, whereby the complete and thorough emulsification of the fat and milk constituents is greatly facilitated. When the steam jet or jets first act upon the mixture of milk and fat, the latter is relatively cool with respect to the steam temperature so that the steam bubbles in collapsing and condensing, exert an impactive force to violently tear apart or disrupt the fat globules and thereby effect a very fine or minute sub-division of the fat particles, such fine subdivision of the fat being necessary in order to secure the emulsion of the fat and milk.

When the temperature of the mixture is increased to about 68° C. so that the difference in temperature between the milk and fat and the steam is less than that which was previously obtained when the steam was first admitted, the impactive force of the collapsing steam bubbles is less severe and the continued admission of the steam primarily acts to further increase the temperature of the mixture. Such treatment of the mixture by the live steam is continued until the temperature of the milk and fat is gradually raised to between 96° and 100° C. This increase in heat further increases the surface tension of the fat with respect to the surrounding liquid in which it is emulsified, and this further insures the retention of the fat in the form of very small or minute particles in union with the milk constituents so that the fat will not rise or separate from the milk and collect upon the surface thereof in the form of a top film. The gradual heat increase of the mixture until about the higher stated temperature is reached, by its action on the milk and fat, serves to prevent coalescence of the fat particles so that permanent stability of the emulsion is secured.

A more specific description of a practical embodiment of the process is as follows:

The container for the skim milk and substituted fat is preferably of such size and shape that the action of the steam jets emanating from a rosette or steaming head is substantially uniformly distributed upon the contents of the container. The steaming head is provided with a multiplicity of fine openings in its lateral and lower walls and is wholly submerged in the contents of the container. The skim milk has a temperature varying from 16° to 30° C., or the same temperature at which it comes from the separator and is then placed in the container or forewarmer. Preferably, we fill the forewarmer with the skim milk to about three-fourths of its capacity. The steam pressure employed may be as low as 15 lbs. per sq. in. if the supply pipe and rosette are large enough to carry out the forewarming process in a practical period of time, such as ten to twenty minutes. However, we use higher steam pressure, such as 90 to 100 lbs., this being the preferred range in practice. No disadvantage will result from the use of even higher pressures, except that when more than 100 lbs. pressure is used, correspondingly heavier pipe fittings must be provided. While emulsification may be expedited by using the higher pressures, the gain in this respect does not compensate for the increased expense involved in handling such pressures.

Each jet of steam upon emergence from the rosette passes bodily through the milk and fat which, being relatively cool, causes the steam globules to condense and exert a violent impactive force upon the milk and fat particles so that the latter are minutely atomized. As the milk is heated by the steam above the coagulation temperature of lacteal albumen, the albumen adheres to and envelopes the simultaneously atomized fat particles and so becomes inseparably entangled therewith. We have ascertained that the size of the diameter of the fat particles is generally well below 20/1000 mm. and from that down to ultra-microscopic size.

We preferably add the vegetable fat to the skim milk in such a quantity as to bring the percentage of fat in the emulsion up to approximately the percentage of animal fat in the original milk, namely, between 3 and 4 per cent. Upon condensation of about 2 to 1, this would give in the finished product a fat content of 6 to 8 per cent.

The fat and skim milk is subjected to the action of the steam for a period of from 10 to 20 minutes, the temperature gradually increasing as described, until the mixture is boiled or brought up to a temperature of 210° or 212° F. In many cases about 206° F. is desirable, at which time the steam supply is shut off. The heat of the steam imparts an even temperature to all portions of the contents of the container, and due to such uniform heating and the simultaneous agitation of the contents of the container under the pressure of the steam, the adherence of the milk solids to the walls of the container is prevented. If the milk solids adhere to the container walls they would possibly cook or bake thereon and if burned, would spoil the taste of the final product. This action of the steam jets, therefore, keeps the inner surface of the container walls clean and sweet. The jets of live steam, being suitably distributed also have the advantage of destroying the vegetative bacteria of the skim milk.

The emulsion of milk and substituted vegetable fat is now subjected to evaporation, preferably in vacuum pans. The temperature of the vacuum pans is controlled within a range of from 54 to 65° C. The vacuum pans are so constructed that they will cause the milk and fat emulsion to roll therein and repeatedly impinge against the heating coils. This agitation of the emulsion and the repeated impingement upon the coils effects a rapid evaporation of the water in the emulsion to a desired degree and maintains the suspended fat particles in a state of uniform distribution and in an emulsified condition with the milk during the evaporation or condensation of the emulsion. Thus there is brought about a condensed condition of the emulsion, the viscosity of the condensed emulsion being increased relatively to the viscosity of the fat particles, and the latter having been thus thoroughly combined and emulsified with the milk solids, the vegetable fat is protected by the milk solids so that it will not be injuriously affected by contact with the heated coils in the vacuum pan.

The emulsion now having been subjected to evaporation and condensed to about 38 to 48 per cent of its original skim milk value, which will depend upon the percentage of solids in the skim milk and the amount desired in the final product, is now conducted from the vacuum pans at substantially the vacuum pan temperature and sent through a homogenizer of any approved or well known type. Substantially the vacuum pan temperature of the condensed emulsion is maintained during treatment in the homogenizers. It follows as a result of the relatively high temperature of the emulsion with respect to the melting point of the cocoanut fat that a finer and still more uniform subdivision of the fat globules in their emulsified state, is obtained. Upon the emergence of the concentrated or condensed emulsion of skim milk and fat from the homogenizers at substantially the vacuum pan temperature, it is then quickly passed over or through cooling coils of metal or the like which will very rapidly cool the emulsion to a temperature of about 4 to 5° C. As a result of this rapid cooling, the finely divided and separated suspended particles of oil or fat are immediately converted into a substantially solid state in which form they have greater specific gravity and so remain sharply defined from each other in minute particles and in separated relation, suspended and incorporated in the milk.

The product may then be canned and thereafter sterilized. Sterilization serves to further insure the stability of the emulsion. Preferably, immediately after sterilization and while the contents of the can is still warm, the cans are placed in a mechanical shaker and the contents thereof agitated for a period of from 1 to 5 minutes.

By means of the improved process above described, the oil or fat particles maintain their separated relative positions in the milk, being in a very finely divided and uniformly distributed state and intimately incorporated with the milk solids in a homogeneous mass so that the fat particles will not rise to the surface and accumulate in a film thereon. At the same time the valuable food qualities of the milk solids are preserved and retained. Although we have above given one example of the practical operation of our new process, we do not consider the invention as necessarily limited to the specific example herein recited, as certain of the steps referred to might be omitted or varied and the essentials of our process whereby the desired product is produced, still carried out in an efficient manner. These essential features of the process we have embodied in the claims appended hereto.

In practice we have secured excellent results with the use of cocoanut oil and have found that a milk product composed of the milk constituents with a cocoanut fat substituted for the original butter fat of the milk has distinct advantages, owing to the valuable properties of the cocoanut oil, while at the same time the product is unaffected in its stability by changes in temperature such as would occur in the transportation of the product from temperate to torrid zones. In other words, our new product is in the nature of a permanent stable emulsion of the milk solids and the substituted fat. The casein and other albuminoids or proteins of the milk retain substantially the same digestible and peptogenic qualities as in the original milk.

Our new product has all the advantages of the ordinary evaporated milk containing the original butter fat with the additional advantage that it is especially adapted for use in tropical climates, owing to the high degree of stability which is obtained by the permanent emulsification of the suspended fat particles with the milk solids.

We claim:

1. The process of producing a liquid condensed food product, which consists in incorporating a fat in milk having butter fat extracted therefrom, and then thoroughly emulsifying and condensing the said milk and fat to a state in which the fat is in permanent suspension and incapable of separation from the milk, and under maintenance of the liquidity of the milk, said condensing being carried out to creamlike consistency.

2. The process of making a milk food, which consists in subjecting milk substantially devoid of animal fat and a substituted fat to agitation under heat and pressure to thereby produce a substantially permanent emulsion of the milk and substituted fat, and subjecting the emulsion to condensation.

3. The process of making a milk food which consists in subjecting milk substantially devoid of animal fat and a substituted fat to the agitating action of live steam, to thereby produce a substantially permanent emulsion of the milk and substituted fat, subjecting the emulsion to condensation while continuously agitating the same, and then homogenizing the emulsion at the condensation temperature.

4. The process of making a milk food which consists in adding cocoanut oil to milk substantially devoid of animal fat and at such temperature as to reduce the surface tension of the milk with respect to the oil, then subjecting the milk and oil to the action of steam under pressure, then subjecting the milk and oil to condensation while maintaining the same in an agitated state, and finally homogenizing the milk and oil at the condensation temperature.

5. The process of making a milk food which consists in mixing a heated fat and skim milk together, the temperature of the skim milk being higher than that of the heated fat, condensing the fat and skim milk to a creamlike consistency, and then homogenizing the mixture.

6. In the art of making a milk food, the sub-process which consists in intimately emulsifying an edible vegetable fat with skim milk by means of steam under pressure moving through the body of fat and skim milk and commingling therewith to thereby gradually increase the temperature of the emulsion to a point above the coagulation temperature of lacteal albumen.

7. In the art of making a milk food, the sub-process which consists in intimately emulsifying skim milk substantially free of butter fat with a substituted fat, and concentrating the emulsion while under agitation, to a creamlike consistency.

8. In the art of making a milk food, the sub-process which consists in subjecting milk substantially devoid of animal fat and a substituted fat to the action of live steam to thereby produce a substantially permanent stable emulsion of the milk and substituted fat, and subjecting the emulsion to condensation.

9. In the art of making a milk food, the sub-process which consists in maintaining an emulsion consisting of condensed milk substantially devoid of butter fat and a substituted fat at substantially the condensation temperature, and then homogenizing the emulsion at that temperature.

10. A milk food product of creamlike consistency, consisting of a permanently stable emulsion substantially devoid of animal fat and containing a substituted vegetable fat intimately incorporated and homogenized with the remaining milk solids and in permanent stable suspension therewith so as to be incapable of physical separation regardless of variations in temperature of the product.

11. A liquid condensed milk food product, consisting of milk from which butter fat has been extracted and a fat substituted for the butter fat, thoroughly emulsified to permanent suspension and incapable of separation and condensed in liquid form to condensed or evaporated milk consistency, and having substantially no odor or taste of the substituted fat.

12. A liquid condensed milk food product, consisting of milk from which butter fat has been extracted and a fat substituted for the extracted butter fat, thoroughly emulsified to permanent suspension and incapable of separation, and condensed in liquid form to condensed or evaporated milk consistency.

In testimony that we claim the foregoing as our invention, have signed our names in the presence of two subscribing witnesses.

CLARENCE S. STEVENS.
CARL A. BAUMANN.

Witnesses:
LYDIA K. GEFFERT,
C. K. SPENCER.